United States Patent [19]
Takada

[11] 3,891,273
[45] June 24, 1975

[54] AUTOMATIC WITHDRAWAL CONTROL MECHANISM FOR VEHICLE SAFETY

[75] Inventor: Takezo Takada, Hikone, Japan

[73] Assignee: Takata Kojyo Co., Ltd., Tokyo, Japan

[22] Filed: Sept. 10, 1973

[21] Appl. No.: 395,797

[30] Foreign Application Priority Data
Sept. 11, 1972 Japan............................ 47-090341

[52] U.S. Cl. ............ 297/388; 24/230 A; 242/107.4
[51] Int. Cl............................................ A62b 35/00
[58] Field of Search....... 297/388, 389; 242/107 SB, 242/107.4; 24/230 R, 230 A, 77, 75

[56] References Cited
UNITED STATES PATENTS

| | | | |
|---|---|---|---|
| 3,020,089 | 2/1962 | Monroe | 297/388 |
| 3,233,296 | 2/1966 | Whittingham | 297/388 |
| 3,323,832 | 6/1967 | Kirkpatrick | 297/388 |
| 3,341,250 | 9/1967 | Rasmusson | 297/388 |
| 3,409,949 | 11/1968 | Kobrehel et al. | 297/388 X |

*Primary Examiner*—James T. McCall
*Attorney, Agent, or Firm*—Wolder & Gross

[57] ABSTRACT

A vehicle safety belt system includes a pair of belt sections, one carrying a buckle and the other carrying a belt retracting reel device provided with a tongue releasably engageable by the buckle. The reel device includes a spring biased belt retracting reel having a ratchet wheel rotatable with the reel and a pawl movable into locking engagement with the ratchet wheel to prevent withdrawal of the belt from the reel. The pawl carries an actuating member which is acted on by the buckle or an element carried by the buckle to advance the pawl to a reel locking position when the buckle and tongue are coupled.

7 Claims, 7 Drawing Figures

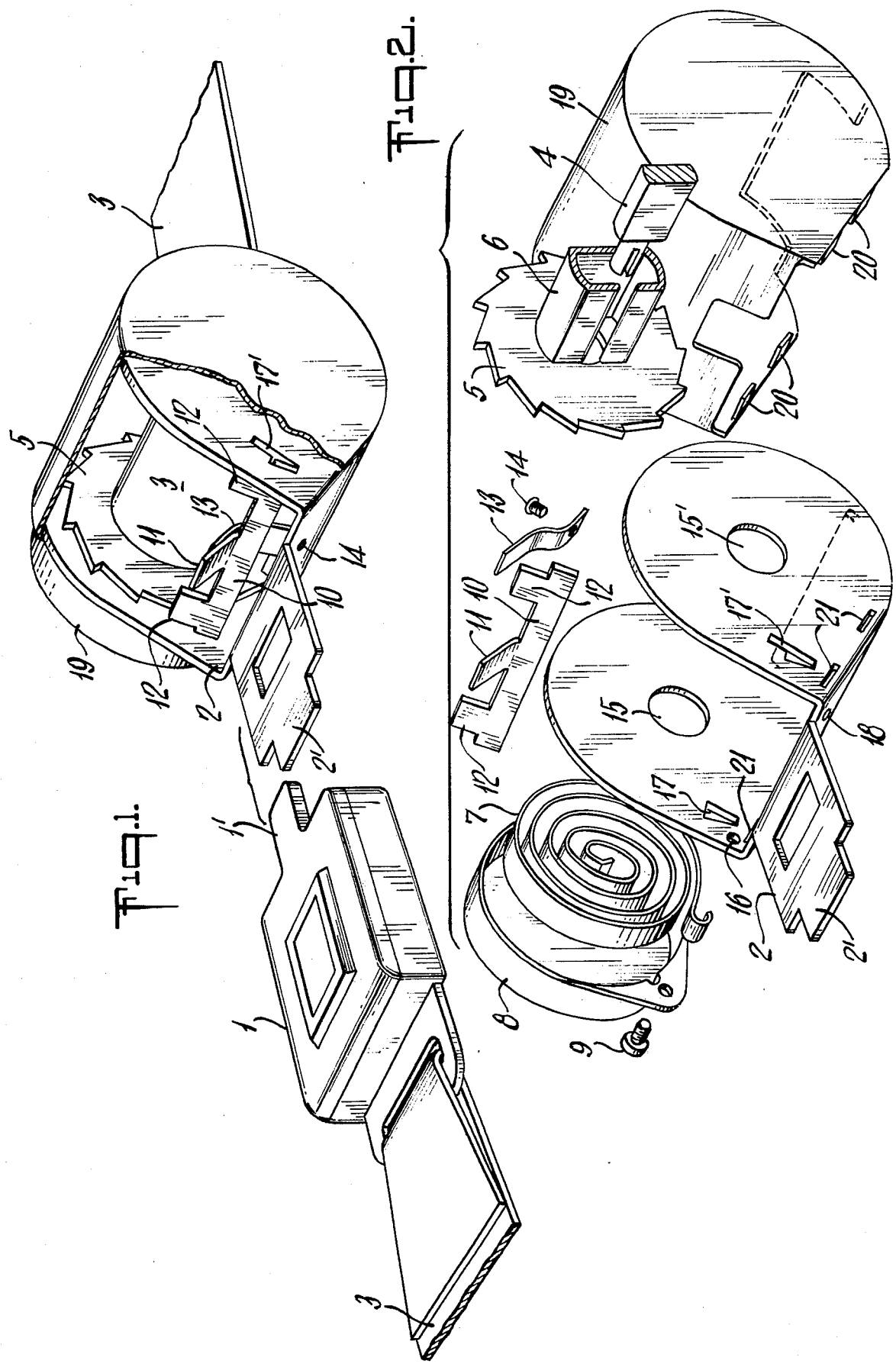

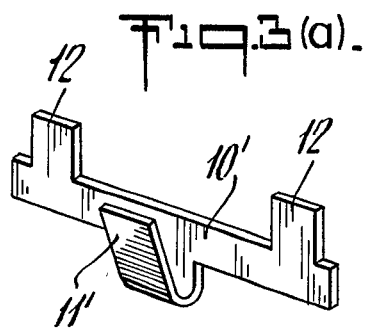
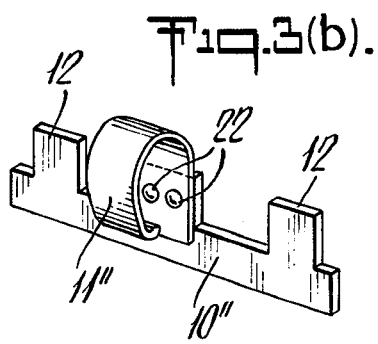
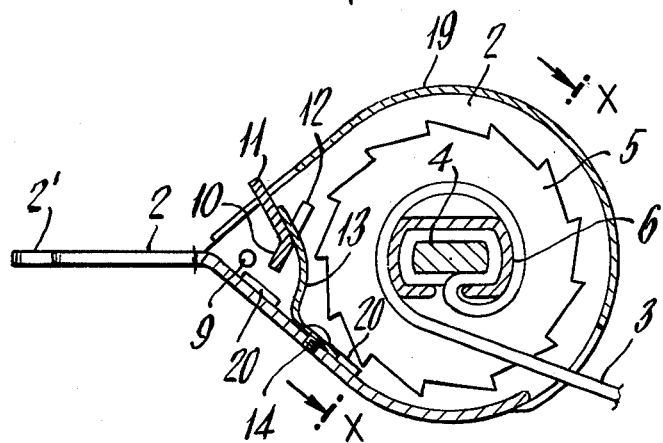
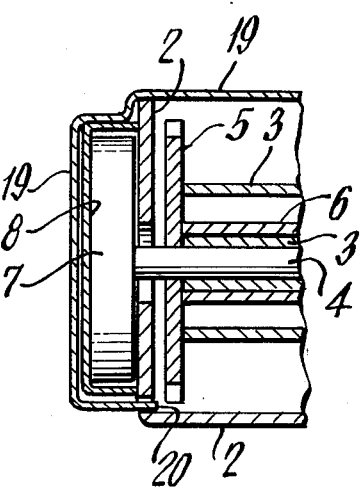
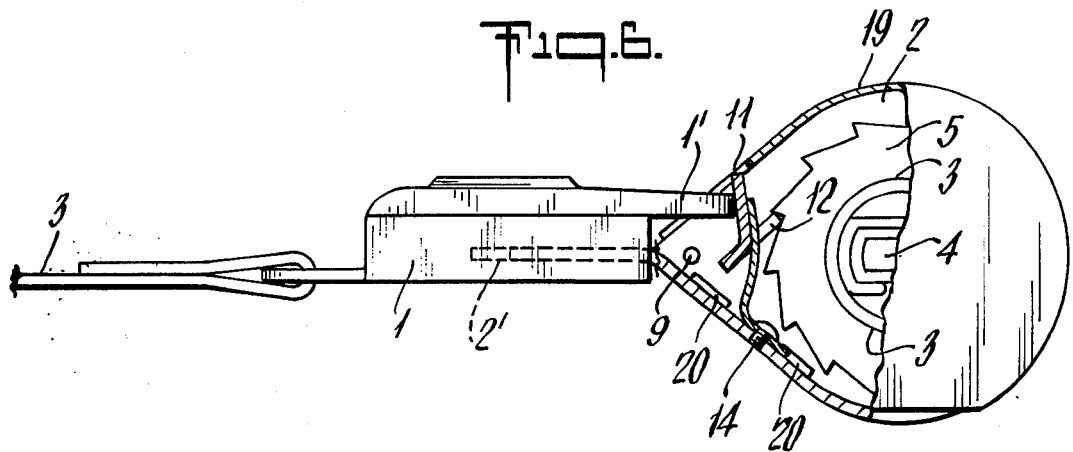

AUTOMATIC WITHDRAWAL CONTROL MECHANISM FOR VEHICLE SAFETY

BACKGROUND OF THE INVENTION

The present invention relates generally to improvements in vehicle safety belts and it relates more particularly to an improved safety belt system of the retractable type in which the length of the withdrawn belt is automatically adjustable.

In restraining an occupant in an vehicle seat to prevent or minimize injury consequent to an accident, the occupant is generally buckled to the seat by a safety belt of adjustable length. The length of the belt should be short and tight enough to firmly engage the body of the occupant, but not so short as to cause discomfort. However, with the conventional safety belt, it has been necessary to manually adjust the length of the belt to properly accommodate the individual occupant, and this involves the inconvenient and difficult manipulation of a frictional or other type of belt length adjustment device. Many types of mechanisms such as manually lockable belt retraction reels have been proposed, but these possess numerous drawbacks and disadvantages. They are complex and unreliable devices, requiring some skill and knowledge for their operation, are frequently inconvenient and otherwise leave much to be desired.

SUMMARY OF THE INVENTION

It is a principal object of the present invention to provide an improved vehicle safety belt system.

Another object of the present invention is to provide an improved safety belt of adjustable length.

Still another object of the present invention is to provide an improved reel retractable safety belt of automatically adjustable belt withdrawal length.

A further object of the present invention is to provide a mechanism of the above nature characterized by its reliability, ruggedness, simplicity, ease and convenience of use and great versatility and adaptability.

The above and other objects of the present invention will become apparent from a reading of the following description taken in conjunction with the accompanying drawings which illustrate preferred embodiments thereof.

In a sense, the present invention contemplates the provision of a vehicle safety belt mechanism comprising a pair of first and second separable coupling members moveable between relatively coupled and uncoupled positions, a retractable reel device connected to the first coupling member and including a spring biased belt retracting reel and a belt connected to the reel and withdrawable from and normally retracted by the reel and locking means alternatively moveable between a first position locking the belt against withdrawl from the reel, and a second position releasing the belt for withdrawal and normally urged to the second positions and means responsive to the coupled position of the coupling members for transferring the locking means to its first position.

In the preferred form of the subject mechanism, a buckle is attached to an end of a first belt section and a retractable reel device is attached to an end of a second belt section, and includes a coupling tongue moveable into releasable locked coupling with the buckle. The belt second section is wound on the spring rewound reel of the reel device, the reel having a ratchet which is rotatable therewith, and a pawl moveable between a ratchet wheel engage and disengage position and spring biased to a disengage position. An actuating element is connected to the pawl and is motivated by the buckle or a member carried by the buckle when the buckle and tongue are coupled to effect the engagement between the pawl and ratchet wheel to lock the reel against belt withdrawal.

The improved safety belt mechanism is simple, reliable, easy and convenient to use and of great versatility and adaptability.

BRIEF DESCRIPTION OF THE DRAWINGS

FIG. 1 is a fragmented perspective view of a safety belt mechanism embodying the present invention;

FIG. 2 is an exploded perspective view of the reel section thereof;

FIGS. 3(a) and 3(b) are perspective views of modified pawl mechanisms for use in the device of FIGS. 1 and 2;

FIG. 4 is a transverse sectional view of the reel device of FIG. 1 illustrated in a reel unlocked condition;

FIG. 5 is a fragmentary medial longitudinal sectional view thereof; and

FIG. 6 is a view similar to FIG. 4 illustrating the reel device in a buckle coupled condition.

DESCRIPTION OF THE PREFERRED EMBODIMENTS

Referring now to the drawings, particularly FIGS. 1, 2 and 4 to 6 thereof which illustrate a preferred embodiment of the present invention, the reference numeral 3 generally designates the opposite sections of a safety belt, one end of each of which is anchored to a corresponding opposite side of a vehicle seat to provide for a lap, shoulder or combination belt. Attached to the unanchored end of one of the belt sections 3 is a vehicle safety belt buckle 1 of conventional construction provided with a forwardly directed lock motivating finger 1'. Located at the unanchored end of the other belt section 3 is a U-shaped reel bracket 2 including a cross plate and opposite parallel side plates, the cross plate being provided with a forwardly projecting coupling tongue 2' having an opening therein and being shaped to be releasably engaged and coupled with buckle 1 in the known manner.

A shaft 4 of non-circular cross section extends between the bracket side plates and terminates at opposite ends in integrally formed stub shafts which are journalled in axially aligned openings 15 and 15' in the bracket side plates, one of the stub shafts being split. A drum 6 is mounted on shaft 4 and is rotatable therewith and has a longitudinal slot through which the end of a corresponding belt section 3 projects and is secured to shaft 4 and drum 6. Affixed to the opposite ends of drum 6 and rotatable with shaft 4 and drum 6 as a unit, is a pair of ratchet wheels 5.

A spiral band rewind spring 7 is disposed along the outside face of one of the bracket side plates and encircles the split stub shaft of shaft 4 with the inner end of spring 7 engaging the split in the stub shaft. A cap or cover shell 8 encloses the spring 7 and is secured to the bracket side plate by a screw 9, the outer end of spring 7 being anchored to a stationary stop or opening 16 in the bracket side plate. With the withdrawal of belt 3 from reel drum 6, the drum 6, ratchet wheels 5 and shaft 4 are rotated clockwise to load spring 7, which, upon release of belt 3 rotates these elements in an opposite direction to retract and rewind the belt.

A ratchet and reel locking pawl member includes a rectangular cross piece or bar 10 extending between the lower front corners of the bracket side plates and engaging aligned opposite triangular apertures 17 and 17' therein to permit the limited rocking of the cross piece 10 about a transverse axis. Integrally formed with cross piece 10 are a pair of opposite transversely projecting pawl members 12 which are moveable with the clockwise and counter-clockwise rocking of cross piece 10 into and out of locking engagement with corresponding ratchet wheels 15 respectively to thereby lock and unlock the reel against withdrawal of the belt 3.

Also integrally formed with the cross piece 10 intermediate the pawl members 12 is a transversely projecting upwardly forwardly inclined pawl actuating arm 10. A curved leaf spring 13 is secured at its inner end to the bracket cross plate and is secured thereto by a screw 14 engaging a tapped opening in the bracket cross plate. The free end of leaf spring 13 bears on the upper portion of actuating arm 11 to thereby resiliently urge the pawl members 12 to their ratchet wheel disengage positions.

A cover shell 19 formed of thin sheet metal or a polymeric resin encloses the reel assembly and is provided with a belt passage defining opening and an opening affording access to the actuating arm 11. The lower side borders of the shell 19 are provided with inwardly directed lugs 20 which engage mating slots 21 along the bottom borders of the bracket side walls to secure the cover shell 19 to the bracket 2.

Considering now the operation and application of the improved mechanism in the normal belt uncoupled condition, the reel drum 6 is rotatable in a belt withdrawal direction by reason of the pawl members 12 being urged by spring 13 to ratchet disengaged positions. The reel assembly is pulled toward the buckle 1 to effect the withdrawal of belt 3 from the reel and the tongue 2' is brought into coupled engagement with the buckle 1. In such coupled engagement between the buckle and tongue, the finger 1' bears on the actuating arm 11 to swing the arm 11, cross piece 10 and pawl members 12 clockwise whereby to bring and retain the pawl members 12 in locking engagement with ratchet wheels 5 and prevent the withdrawal of belt 3. However, any slack in the belt 3 is retracted by the drum 6 which is urged in a belt retraction direction by spring 7. Upon unbuckling of the belt, the finger 1' is retracted and the pawl members 12 are retracted to their unlock position under the influence of spring 13, so that the corresponding belt section is rewound under the influence of spring 7.

In FIGS. 3(a) and 3(b) of the drawings, there are illustrated different forms of pawl actuating members which obviate the need for the buckle motivating finger 1', the devices being otherwise similar to that described above. Specifically, in the structure illustrated in FIG. 3(a) the pawl actuating member 11' is of V- or L-shaped configuration, including an arm projecting forwardly from the bottom edge of cross piece 10' intermediate the pawl members 12 and terminates in an upwardly directed front actuating leg. Accordingly, when the buckle 1 and the tongue 2' are intercoupled, the leading face of the buckle 1, per se, or a forshortened finger 1' bears on the upper part of the actuating member front leg to move the pawl members 12 into engagement with the ratchet wheels 5 against the influence of spring 13.

In the embodiment as shown in FIG. 3(b) there is substituted for the actuating member 11' an actuating member 11" and in all other respects the devices are similar. The actuating member 11" is in the shape of a curved resilient member formed of a resilient material such as metal leaf spring or a resilient polymeric resin. The rear end of the actuating member 11" is suitably firmly affixed to the upper border of cross piece 12 between pawl members 12 and extends therefrom in a curved manner first upwardly, then forwardly, and then downwardly, terminating in a beaded end edge. The operation of the last described embodiment is similar to that previously described.

While there have been described and illustrated preferred embodiments of the present invention, it is apparent that numerous alterations, omissions and additions may be made without departing from the spirit thereof.

I claim:

1. A vehicle safety belt mechanism comprising a pair of separable first and second coupling members movable between relatively coupled and uncoupled positions, a retractable belt reel device connected to said first coupling member and including a spring biased belt retracting reel and a belt connected to said reel and withdrawable from and normally retracted by said reel and locking means mounted on said first coupling member and separate from said second coupling member and alternatively movable between a first position locking said belt against withdrawal from said reel and a second position releasing said belt and normally urged to said second position and means responsive to the coupled position of said coupling members and actuated by said second coupling member for transferring said locking means to said first position.

2. The mechanism of claim 1 wherein said reel device comprises a bracket member rotatably supporting said reel and said first coupling member is connected to said bracket.

3. The mechanism of claim 2 wherein said locking means comprises a ratchet wheel rotatable with said reel and a pawl member movable between a first locking position engaging said ratchet wheel and a second release position out of engagement with said ratchet wheel and spring biased to said second position, said pawl member being urged to said first locking position by said second coupling member advancing to its coupled position.

4. The mechanism of claim 3 wherein said coupling responsive transfer means includes an actuating member connected to and moveable with said pawl member and being engageable and maintained by said second coupling member when engaged by said first coupling member in a position in which said pawl member and ratchet are in engagement.

5. The mechanism of claim 3 including a cross piece rockably supported by said bracket and carrying said pawl member for rocking therewith into and out of engagement with said ratchet wheel and said transfer means comprising an actuating member supported by and rockable with said cross piece and motivated by the engagement of said coupling members to move and maintain said pawl member in engagement with said ratchet wheel.

6. The mechanism of claim 5 wherein said second coupling member comprises a buckle and said first coupling member comprises a tongue releasably engaging said buckle, a part of said buckle engaging said actuating member when said buckle and tongue are intercoupled.

7. Belt take-up adjusting device in safety belt buckle including a buckle body and a tongue, comprising a take-up spring, a shaft, a ratchet, a pawl and the like these of which are provided around the rear end place of said tongue, characterized in that motivating of buckle coupling makes a projection of buckle body and the like push the claw of said pawl provided on the tongue so as to have said claw engage with said ratchet to prevent extending of the belt, so that the belt length fitted on the occupant body can be determined on belt fastening situation naturally.

* * * * *